United States Patent [19]

Wharton

[11] 4,215,332
[45] Jul. 29, 1980

[54] PROBE THERMOSTAT WITH SWIVEL

[75] Inventor: Gerald R. Wharton, Mansfield, Ohio

[73] Assignee: Therm-O-Disc, Incorporated, Mansfield, Ohio

[21] Appl. No.: 962,072

[22] Filed: Nov. 20, 1978

[51] Int. Cl.² ............................................. H01H 37/36
[52] U.S. Cl. ................................... 337/394; 337/382;
403/254; 403/353
[58] Field of Search ............... 337/394, 393, 382, 386,
337/139; 403/254, 353

[56] References Cited
U.S. PATENT DOCUMENTS

| 3,732,518 | 5/1973 | Them et al. | 337/394 |
| 3,906,424 | 9/1975 | Clancy et al. | 337/394 |

Primary Examiner—Harold Broome
Attorney, Agent, or Firm—Pearne, Gordon, Sessions, McCoy & Granger

[57] ABSTRACT

A probe-type thermostat is disclosed in which the probe is mounted for swiveling movement in a manner in which the thermostat calibration is not adversely affected. The probe includes a tube mounted on the thermostat base for swiveling movement about a first center and a rod connected to the thermostat operator or movable member for swiveling movement about a second center. The base and the movable member are each formed with spherical seats which are opened through lateral openings to an edge so that the probe assembly can be moved along the lateral openings to the assembled position.

9 Claims, 6 Drawing Figures

PROBE THERMOSTAT WITH SWIVEL

BACKGROUND OF INVENTION

This invention relates generally to probe thermostats and, more particularly, to a probe thermostat having a novel and improved swivel structure which allows swiveling of the probe with respect to the thermostat base.

PRIOR ART

The U.S. Letters Pat. No. 3,732,518 and 3,906,424 (both assigned to the assignee of the present invention) disclose probe thermostats wherein the probe may be swiveled with respect to the base. Both such patents disclose swivel-type probes and the present invention is an improvement thereof. Both patents are incorporated herein by reference.

SUMMARY OF THE INVENTION

In accordance with the present invention, an improved swivel structure is provided for probe type thermostats which facilitates assembly and simplifies the swivel structure.

In accordance with the illustrated embodiment, the thermostat includes a base with a switch mounted thereon, and a movable member mounted on the base causes switch operation in response to its movement. A probe consisting of inner and outer elements having different coefficients of thermal expansion is connected by swivel connections to the movable member and the base, respectively. Each swivel connection provides a spherical seat respectively on the base and movable member which is laterally open through a passageway to an edge and allows lateral movement of the inner element of the probe to its assembled position.

Three embodiments are illustrated for the swivel structure of the inner member. One embodiment involves a head integrally formed on the end of the inner element which mates with the seat of the movable element. In the other two embodiments, an eyelet or flanged sleeve is secured to the end of the inner element of the probe and the flange is shaped to mate with the associated seat of the movable member.

BRIEF DESCRIPTION OF THE DRAWINGS

FIG. 1 illustrates an assembled thermostat incorporating the present invention. Such thermostat includes a base 10 having a stack switch 11 mounted thereon. The switch 11 includes spacers 12, 13 and 14 and a support plate 16, all of which are connected together and connected to the base 10 by a tubular rivet 17. Two contact arms 18 and 19 and a spring arm 21 of an over center spring 22 are mounted between the spacers 12 through 14. An insulator bumper 23 is carried by a movable arm 24 and operates the over center spring 22 when moved by the movable arm 24 to predetermined operating positions.

Figure 1:
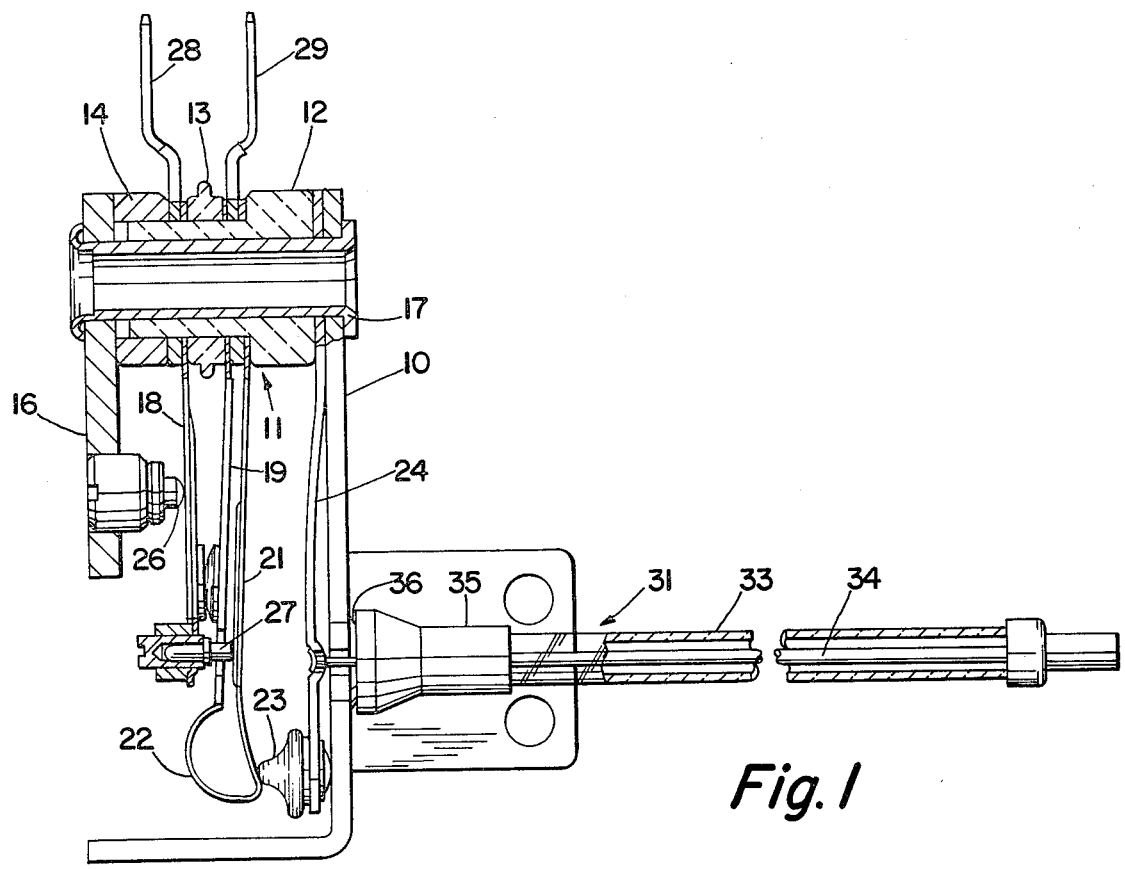
FIG. 1 is a side elevation of a thermostat incorporating the present invention.

The calibration of the operating temperature of the switch is determined by an adjustable projection 26 carried by the support plate 16 and a second adjustable projection 27 carried by the contact arm 18. The two projections 26 and 27 are adjusted during the manufacture of the thermostat so that the switch will snap open upon reaching a predetermined temperature, for example, 1100° F. The over center spring 23 functions to give the switch a snap action.

A firstterminal 28 is electrically connected to the contact arm 18 and a second terminal 29 is electrically connected to the contact arm 19. When the contacts are closed as illustrated, an electrical connection is provided between the two terminals 28 and 29 and when the switch opens, separating the contacts, the two terminals are disconnected.

The switch as thus far described is functionally the same as the switch 32 illustrated in U.S. Pat. No. 3,906,424 and in FIG. 3 of Pat. No. 3,732,518 mentioned above.

Connected to control the relative position between the base 10 and the movable member 24 is a probe assembly 31, which includes an outer element or tube 33 and an inner element or rod 34 formed of materials having dissimilar coefficients of thermal expansion. The tube 33 in the illustrated embodiment is formed of glass having a relatively low coefficient of thermal expansion and is provided with a swivel socket member 35 at one end which supports the end of the tube 33 on a spherical seat 36 formed in the base 10.

The inner element 34 is provided with an eyelet or flanged sleeve 37 which is welded or otherwise suitably connected to the end of the rod 34. The flange 38 of the eyelet mates with a spherical seat 39 formed in the movable member 24. The outer ends of the tube 33 and rod 34 are connected in the manner described in greater detail in U.S. Pat. No. 3,732,518, supra. The two spherical seats 36 and 39 are structured so that their centers of curvature are substantially coincident when the movable member 24 is substantially in the position in which the switch is operated so that the swiveling action does not materially affect the calibration of the device. This arrangement is disclosed and claimed in U.S. Pat. No. 3,732,518, supra, and reference may be made to such patent for a more detailed description of the swivel action and the structural arrangement of the probe.

Figure 3:
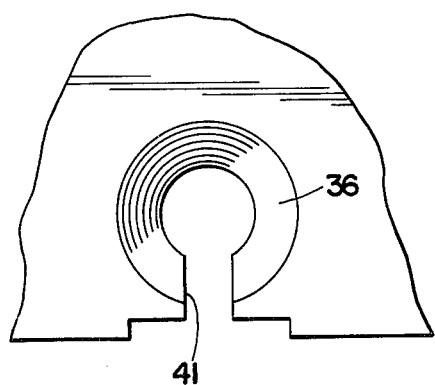
FIG. 3 is an enlarged fragmentary view of the spherical seat formed in the base.
Figure 4:
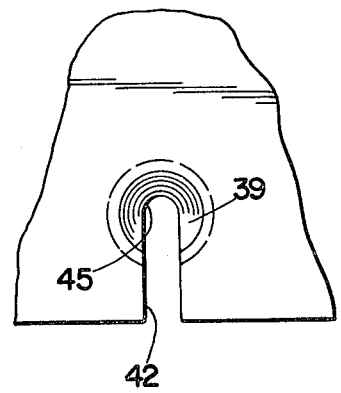
FIG. 4 is an enlarged fragmentary view of the seat formed in the movable member.

In accordance with the present invention, the two seats 36 and 39 are formed with lateral passages 41 and 42, as illustrated in FIGS. 3 and 4, respectively, which are parallel in the assembled device. Such lateral passageways allow the probe to be partially preassembled with the rod or inner element 34 positioned within the outer tubular element 33. During assembly, the rod 34 is moved along the two passageways 41 and 42 until the respective elements 35 and 37 are properly positioned against the respective spherical seats 36 and 39.

If necessary, the connection between the rod and the outer element at their ends remote from the base 10 can be made after the probe subassembly is positioned within the seat. Once the assembly is completed, the two adjustable projections 26 and 27 are adjusted to produce the desired switch operation at the required temperature.

The movable member 24 is shaped so that in the assembled position the movable member is in a stressed condition and provides a spring force urging the rod 34 toward the left, as viewed in FIG. 1. This causes the rod to be placed in tension, and maintains mating engagement between the mating parts of the two swivels. The socket member 35 and the flange 38 have a diameter substantially larger than the width of the passages 41 and 42 so that the presence of such passages does not have any material effect on the swivel action of the probe.

Such a structure permits the probe 31 to be partially assembled with the eyelet or sleeve 37 welded to rod 34 and the rod extending into the tube 33. The subassembly is then moved laterally into the assembled position. Further, it makes it practical to arrange the overall structure so that portions of the switch 11 are in alignment with the probe 31 without encountering assembly problems. In the illustrated embodiment, the thermostat is more compact and the end of the movable member adjacent to the probe acts directly on the spring 22. This structure provides improved accuracy in the operation of the switch.

Figure 2:
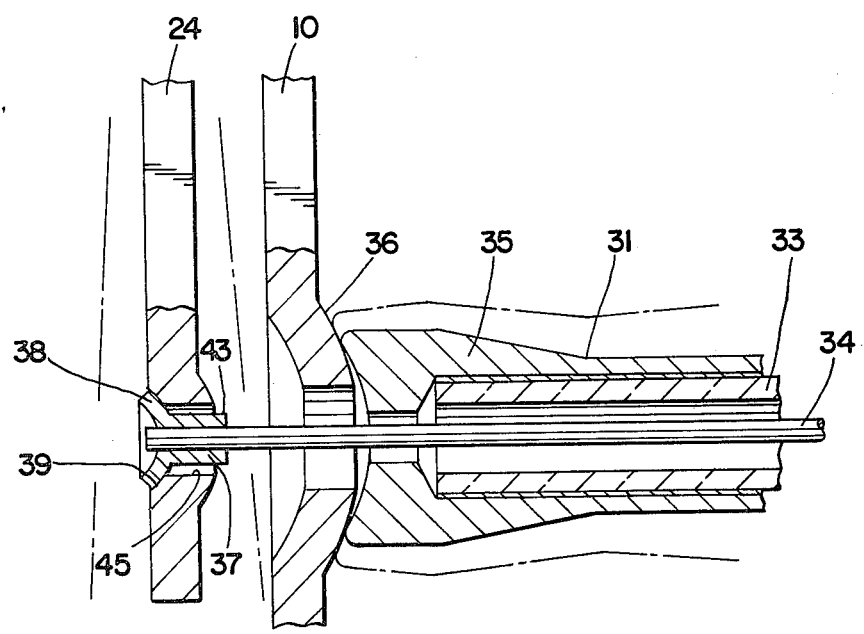
FIG. 2 is an enlarged fragmentary cross section illustrating the two swivels which respectively connect the probe elements to the base and the movable member which operates the switch.

In the first embodiment illustrated in FIG. 2, the eyelet is formed with its sleeve section 43 extending from its flange in a direction towards the outer extremity of the probe and extends through the opening 45 within the seat 39. Further, the flange is preferably curved to mate with the spherical seat 39.

Figure 5:
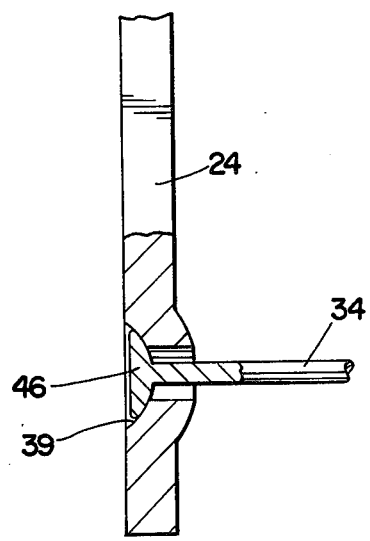
FIG. 5 is a fragmentary section illustrating a second embodiment in which the inner probe element is formed with an integral head on one end; and, FIG. 6 is an enlarged section illustrating an embodiment in which a flanged sleeve or eyelet is mounted on the end of the inner probe element wherein the eyelet has a different shape from the eyelet illustrated in FIG. 2.

The embodiment of FIG. 5 differs from the embodiment of FIG. 2 in that in the embodiment of FIG. 5, the eyelet or flange sleeve is not required. In such embodiment, the rod is headed to provide an integral head 46 having an undersurface which engages and mates with the seat 39. Such embodiment is used in instances in which the material forming the rod 34 can be conveniently upset in a typical heading operation.

Figure 6:
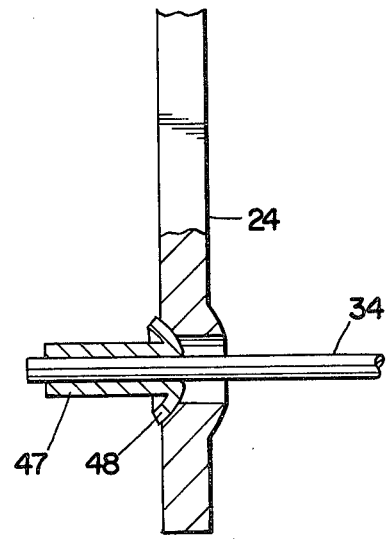

The embodiment of FIG. 6 is similar to the embodiment of FIG. 2 in that a flanged sleeve or eyelet is again provided. In this instance, however, the sleeve 47 extends from the seat in a direction away from the outer extremity of the probe and the flange 48 is shaped to extend back along the sleeve 47 to mate with the seat 39. With each of the embodiments illustrated, it is not necessary to utilize a separate swivel member as illustrated in U.S. Pat. No. 3,732,518, and when the embodiment of FIG. 5 is used, it is not necessary to provide an eyelet or to assemble the eyelet on the rod. Generally the embodiment of FIG. 5 is preferred when the size of the rod and the material of the rod permit economical heading to form an integral head. In instances in which the heading operation is impractical to perform, the embodiment of FIG. 2 is preferred.

Although preferred embodiments of this invention have been shown and described, it should be understood that various modifications and rearrangements of the parts may be resorted to without departing from the scope of the invention as disclosed and claimed herein.

What is claimed is:

1. In a thermostat including body means, a switch on said body means including a member movable relative to the body means to cause opening and closing of said switch, a thermally responsive probe assembly including first and second elements movable relative to each other in response to temperature changes, first and second swivels respectively connecting said first element to said body means and said second element to said member for pivotal movement about first and second centers, relative movement between said elements causing relative movement between said centers and operation of said switch, the improvement comprising a substantially spherical first seat on said body means, and a substantially spherical second seat on said movable member each forming a part of one of said swivels, said body means and said member each being formed with a passageway extending from an edge to its spherical seat along which said second element is laterally moved to its assembled position during the assembly of said thermostat, said passageways and said swivels being formed so that said passageways do not affect the action of said swivels after assembly of said thermostat, portions of said switch being aligned with and substantially adjacent to one end of said probe preventing easy axial installation of said second element into its associated seat.

2. A thermostat as set forth in claim 1, wherein said movable member engages an element of said switch substantially adjacent to said second swivel.

3. A thermostat as set forth in claim 1, wherein said second element is formed with an integral head having a surface shaped to mate with said second seat, said head having a diameter substantially larger than the width of the associated passageway.

4. A thermostat as set forth in claim 1, wherein a flanged eyelet is mounted on said second element adjacent its inner end, said eyelet providing a curved flange mating with said second seat.

5. A thermostat as set forth in claim 4, wherein said eyelet includes a sleeve secured to said second element, said sleeve extending from said flange in a direction away from said inner end.

6. A thermostat as set forth in claim 4, wherein said eyelet includes a sleeve secured to said second element, said sleeve extending from said flange in a direction toward said inner end.

7. A method of assembling a thermostat including body means, a switch on said body means providing a member movable relative to said body means to cause opening and closing of said switch, a thermally responsive probe assembly including first and second elements movable relative to each other in response to temperature changes, first and second swivels respectively connecting said first element to said body means and said second element to said member for pivotal movement about first and second centers, relative movements between said elements causing relative movements between said centers and operation of said switch, said switch providing portions aligned with and substantially adjacent to one end of said probe preventing easy axial installation of one of said elements on its associated body means or member, comprising forming a substantially spherical first seat on said body means and a substantially spherical seat on said movable member, each forming part of one of said swivels, forming each of said body means and said member with a passageway extending from an edge of its spherical seat, and moving said second element laterally along said passageways to its installed position after said switch is mounted on said body means.

8. A method as set forth in claim 7, wherein said first and second elements are assembled together before installation and are assembled on said thermostat as a subassembly.

9. A method as set forth in claim 7, wherein the ends of said elements remote from said seats are connected together after said elements are assembled on said thermostat.

* * * * *